United States Patent
Kelly

(10) Patent No.: US 9,134,739 B2
(45) Date of Patent: Sep. 15, 2015

(54) ADAPTIVE ANALOG COMPENSATOR FOR A POWER SUPPLY

(75) Inventor: Anthony Kelly, Old Kildimo (IE)

(73) Assignee: POWERVATION LIMITED, Castletroy, County Limerick (IE)

( * ) Notice: Subject to any disclaimer, the term of this patent is extended or adjusted under 35 U.S.C. 154(b) by 558 days.

(21) Appl. No.: 13/496,862

(22) PCT Filed: Sep. 15, 2010
(Under 37 CFR 1.47)

(86) PCT No.: PCT/EP2010/063582
§ 371 (c)(1),
(2), (4) Date: Aug. 1, 2012

(87) PCT Pub. No.: WO2011/033004
PCT Pub. Date: Mar. 24, 2011

(65) Prior Publication Data
US 2013/0134951 A1    May 30, 2013

(30) Foreign Application Priority Data
Sep. 17, 2009 (GB) .................................. 0916312.2

(51) Int. Cl.
*H02M 3/157* (2006.01)
*G05F 1/46* (2006.01)
*H02M 3/156* (2006.01)

(52) U.S. Cl.
CPC ............. *G05F 1/46* (2013.01); *H02M 3/156* (2013.01); *H02M 3/157* (2013.01)

(58) Field of Classification Search
CPC .............. H02M 3/156–3/158; H02M 3/139; H02M 2001/0025; H02M 2001/0016; H02M 2001/0019; G05F 1/46

USPC ............................................................ 323/283
See application file for complete search history.

(56) References Cited

U.S. PATENT DOCUMENTS

| | | | |
|---|---|---|---|
| 5,625,279 A | 4/1997 | Rice et al. | |
| 5,646,513 A | 7/1997 | Riggio, Jr. | |
| 5,909,111 A | 6/1999 | Ressel et al. | |
| 6,904,422 B2 * | 6/2005 | Calise et al. | 706/23 |
| 2004/0119548 A1 * | 6/2004 | Karlquist | 332/112 |
| 2006/0176098 A1 * | 8/2006 | Chen et al. | 327/341 |
| 2007/0018623 A1 | 1/2007 | Lopata | |
| 2007/0063682 A1 | 3/2007 | Dagher | |

(Continued)

FOREIGN PATENT DOCUMENTS

WO  WO 2006/086674 A2  8/2006
WO  WO 2006/086674 A3  8/2006

OTHER PUBLICATIONS

International Preliminary Report/Written Opinion for International Application No. PCT/EP2010/063582, Powervation Ltd., dated Mar. 29, 2012, 7 pages.

(Continued)

*Primary Examiner* — Jessica Han
*Assistant Examiner* — Gustavo Rosario Benitez
(74) *Attorney, Agent, or Firm* — Hickman Palermo Becker Bingham LLP; Edward A. Becker

(57) ABSTRACT

The present application is directed at methods of controlling power supplies. In particular the present application employs an analog compensator to control the power stage of the power supply with a digital tuner employed to adaptively tune the operation of the analog compensator.

19 Claims, 4 Drawing Sheets

(56) References Cited

U.S. PATENT DOCUMENTS

| | | | |
|---|---|---|---|
| 2007/0112443 A1* | 5/2007 | Latham et al. | 700/29 |
| 2007/0120506 A1* | 5/2007 | Grant | 315/312 |
| 2010/0327932 A1* | 12/2010 | Aparin et al. | 327/254 |
| 2011/0095826 A1* | 4/2011 | Hadjichristos et al. | 330/279 |

OTHER PUBLICATIONS

International Searching Report/Written Opinion for International Application No. PCT/EP2010/063582, Powervation Ltd., dated Sep. 15, 2010, 11 pages.

Search Report under Section 17(6) for GB Patent Application No. GB 0916312.2 dated May 20, 2010, 1 page.

\* cited by examiner

ADAPTIVE ANALOG COMPENSATOR FOR A POWER SUPPLY

FIELD

The present application relates to power supplies and methods of controlling same.

BACKGROUND

Power supplies are employed to convert one voltage to another and may include converting from AC-DC, DC to AC, DC-DC or indeed AC-AC. DC-DC converters are devices which are employed to convert an input DC voltage to another DC voltage.

DC-DC converters may be described generally as either linear or switching converters. The present application is directed to both linear and switching converters. For convenience the background will now be described with reference to a switching DC-DC converter.

A conventional arrangement for a switching DC-DC converter 10 as shown in FIG. 1 uses a power stage 18 comprising one or more switching devices and one or more inductors and capacitors to convert an input voltage ($V_{in}$) to an output voltage ($V_{out}$). An analog compensator 14 is employed to try and maintain the output voltage at a desired set point, typically this is achieved by attempting to minimize the error corresponding to the difference 12 between the set point and output voltage. It will be appreciated that a gain may be applied to the output voltage in the feedback path to reduce this voltage for convenience in the circuitry but this is omitted to simplify the circuit for the purposes of explanation. Conventionally, pulse width modulation is employed to control the operation of the switching devices within the power stage 18, with the analog compensator 14 providing a control signal to a PWM module 16 which provides switching signals to one or more switching devices within the power stage 18. A variety of different switching circuit topologies may be employed within the power stage 18 which will be familiar to those skilled in the art, including for example the conventional buck and boost topologies, and switched capacitor types.

The analog compensator is typically designed to maximize the performance of the DC-DC converter in a typical circuit. Whilst this approach is suitable for most DC-DC applications, as user requirements increase it becomes difficult for conventional analog compensators to meet user requirements. There are several reasons for this including that the characteristics of the power stage may vary considerably from design values and as a result even a controller designed for a specific power stage and\or application may result in less than optimum control. In addition, other factors can affect the controller including the input voltage and load. It will be appreciated by those skilled in the art that a particular difficulty with control of DC-DC power supplies is the relatively high speed of switching of the switching elements of the power supply and the speed of corresponding load changes which can be nearly instantaneous in the case of electronic loads such as processors and similar logic circuitry.

It will be appreciated generally that adaptive control may be classified generally as either parametric or non-parametric. Online adaptive control is usually based upon a parametric model whereby the plant to be controlled is described by a model with various parameters. The values of the parameters are estimated online using parameter estimation and can therefore run continuously, without requiring a measurement phase or introducing disturbances into the system. These are usually recursive algorithms which estimate the values of the parameters in the chosen model. Examples of estimation algorithms include gradient estimation, least squares, recursive least squares with exponential forgetting, stochastic approximation. The estimated parameters may be derived directly or indirectly. Indirect parametric adaptive control methods require an estimator that outputs an estimate of the parameters of the model to the tuner. When direct parametric methods are employed tuning is based upon signals related to the parameters of the model and the estimation of the model parameters is therefore implicit.

Non-parametric adaptive control involves techniques such as transient analysis, frequency analysis, correlation analysis, in which certain properties of the system are identified, such as bandwidth, settling time etc. during a measurement phase. The requirement for a measurement phase disturbs closed-loop regulation. Non-parametric modelling is sensitive to noise making it hard to get accurate results and is not usually suitable for on-line system identification. Typically, non-parametric adaptive control methods can be conveniently described using flowcharts of the experiment phase; whereas parametric methods can run continuously and therefore a flowchart description is not generally applicable.

Saggini and Mattavelli in "A Simple Digital Auto-Tuning For Analog compensator in SMPS" discloses a non-parametric adaptive controller employing a tuning technique which introduces a non-linear gain into the control path during a tuning phase in which the controller parameters are tuned. The disadvantage of this approach is that practically it may only be used as part of an initial calibration and in common with non-parametric adaptive methods, is sensitive to disturbances. During use, the characteristics of the power stage may change and thus require further tuning. However, this would not be practical without disturbing the output voltage and would thus be undesirable.

As a result of the limitations inherent with analog compensators and so as to generally improve the performance of DC-DC controllers and provide greater functionality, it is known to implement the controller in digital form where more advanced control techniques may be employed. An example of a digital controller is described in U.S. Ser. No. 12/439,802, which is assigned to the present assignee, and the entire contents of which are hereby incorporated by reference. Whilst the technique proposed in this patent application offers significant advantages over the prior art, the use of digital controllers introduces a time delay which may limit the performance of the digital controller. Additionally, there is a familiarity in the market with analog compensators (albeit non-adaptive).

Whilst conceivably adaptive control may be implemented in an analog compensator, those skilled in the art will appreciate the problems including the requirement for a reference model response. Additionally, there are known problems generally associated with DC-offsets in analog multipliers which make these generally impractical.

Accordingly, there is a need for a controller for a power supply, such as for example a DC-DC converter, which addresses some or all of the problems associated with the prior art.

SUMMARY

The inventors of the present application have realized that whilst digital control allows for more advanced control techniques, there may be advantages to leaving the compensator in analog form. Thus the present application provides an adaptive controller for a power supply, such as for example a switching or linear DC-DC converter, in which primary control of the DC-DC converter is performed by an analog compensator. Adaptive control is implemented by providing for the analog compensator to be tunable by a tuner in a way which provides for practical implementation which allows the analog compensator to work in a substantially continuous manner without the necessity for a calibration phase.

Having the ability to work continuously, the tuner can be considered to be in the class of parametric adaptive control systems.

In a first aspect an adaptive controller is provided comprising an analog compensator using feedback to maintain an output of a power supply, for example a switch mode or linear DC-DC converter, at a desired set point. The analog compensator is implemented in a circuit with at least one component in the circuit being adjustable to modify the transfer function of the controller and wherein a tuner implemented digitally is employed to continuously monitor at least one signal within the primary controller and to adjust the at least one circuit component in response to the monitoring of the at least one signal to provide adaptive control of the primary controller. In this way, the direct method of parametric adaptive control is employed whereby the said signal is implicitly responsive to the model parameters of the system.

In a second aspect, a controller is provided for power supply, e.g. a switch mode or linear DC-DC converter. The controller comprises an analog compensator for providing a control signal to at least one circuit of the power supply to maintain the output of the power supply at a set-point, wherein the analog compensator includes at least one adjustable component which may be adjusted to alter the transfer function of the analog compensator, wherein the controller further comprises a tuning controller for adjusting the adjustable component to tune the operation of the analog compensator, wherein the tuning controller is responsive to at least two signals from within the analog compensator, wherein the tuning controller is responsive to sign changes in each of the signals. In this way, the direct method of parametric adaptive control is employed whereby the said two signals are implicitly responsive to the model parameters of the system. In this second aspect, the tuning controller may be implemented in digital or analog form.

In a third aspect, a controller is provided for a switch mode power supply, e.g. a DC-DC converter, the controller comprising an analog compensator for providing a control signal to the power supply, the analog compensator comprising at least one component for adjusting the transfer function of the analog compensator, the controller further comprising a digital model of the analog compensator, wherein at least one measurement from within the digital model is employed to adjust the at least one component of the analog compensator. In this third aspect, a tuning controller may be employed to perform the adjustment. The tuning controller may be implemented in either analog or digital form.

The techniques of the present patent application may be applied within single or multiple phase control ICs, and are suitable generally for any power stage topology.

DETAILED DESCRIPTION OF DRAWINGS

Figure 1:
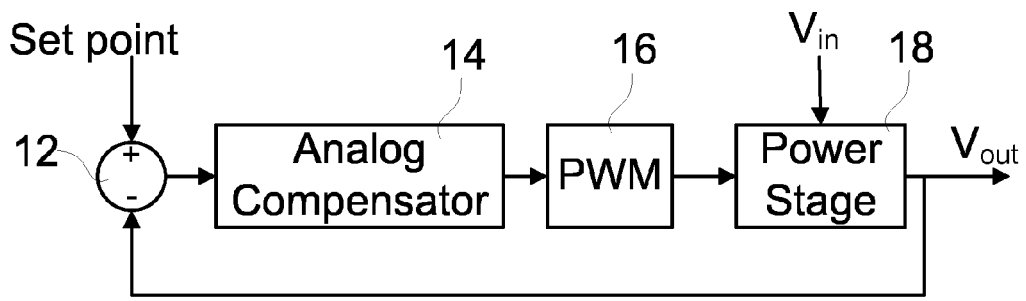
FIG. 1 is a block diagram of a DC-DC converter known from the Prior Art.
Figure 2:
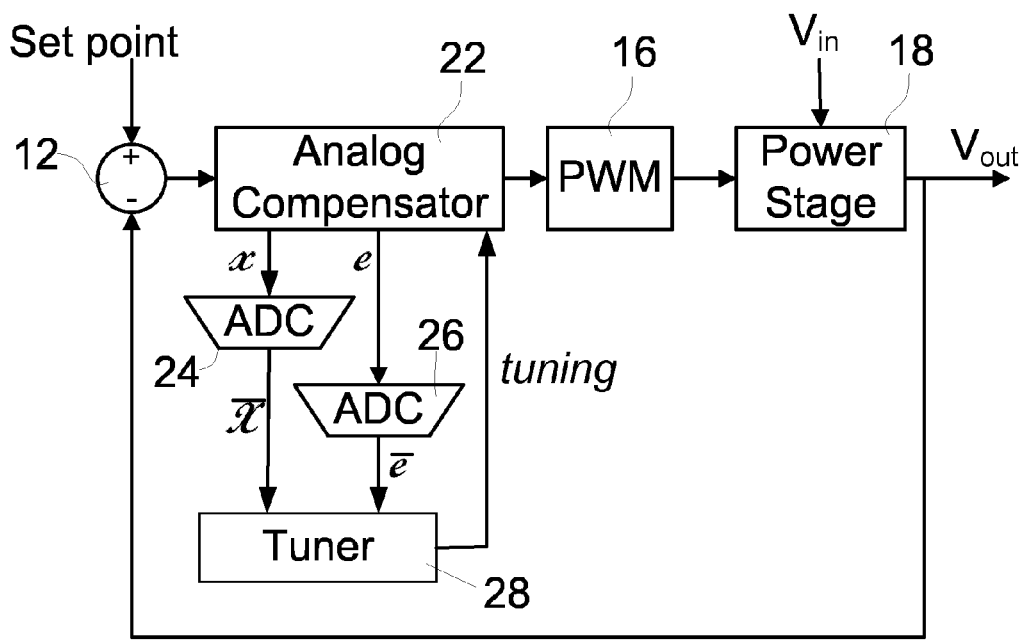
FIG. 2 is a block diagram of a circuit arrangement according to a first embodiment of the present application.
Figure 6:
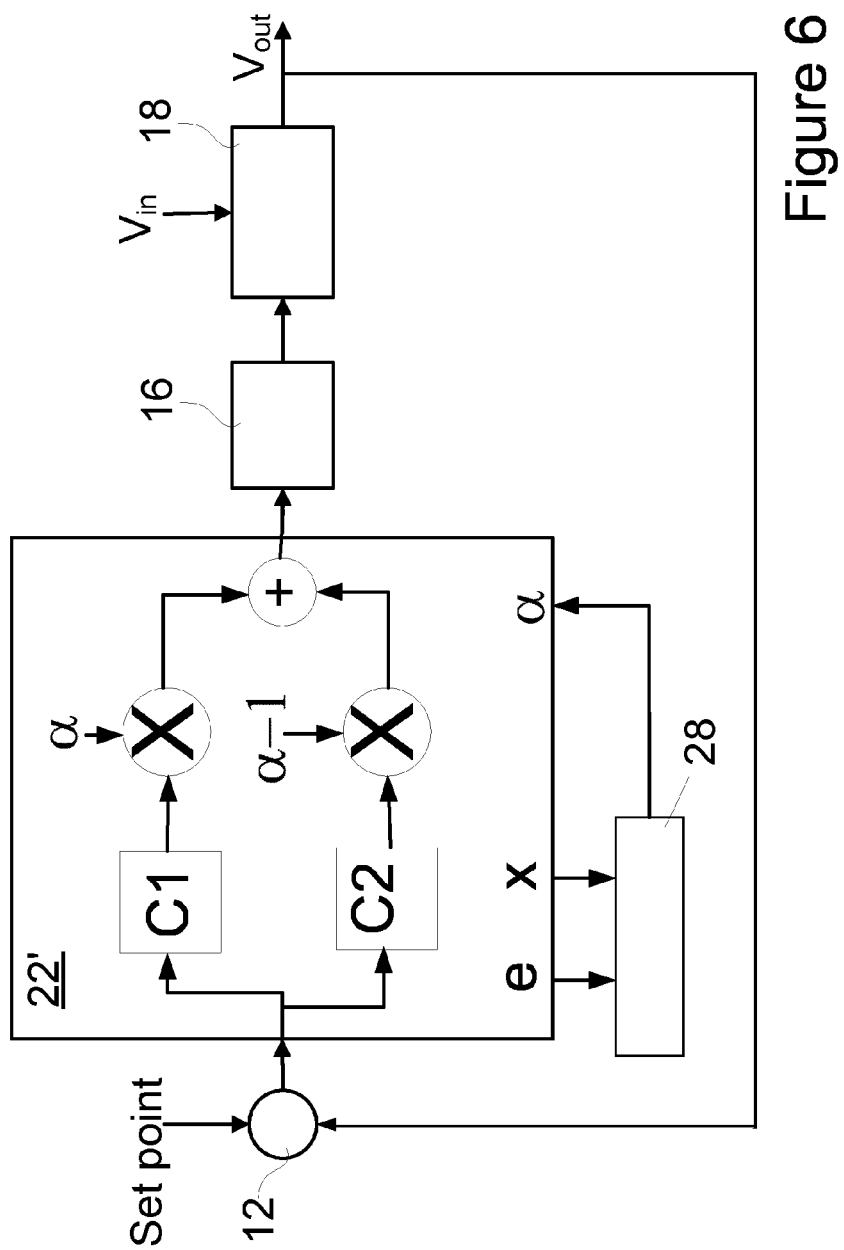
FIG. 6 is a block diagram of an exemplary arrangement of the embodiment of FIG. 2.

The present application is directed to power supplies, for example switch mode supplies where modulation, e.g. Pulse Width Modulation (PWM), is used to control one or more switching elements. PWM may be implemented using a PWM circuit which provides switching signals to one or more switches in the power supply. An analog compensator controls the PWM circuit in an effort to maintain an output from the power supply (typically voltage) at a desired set-point as shown in the arrangement of FIG. 1. In particular, the application is directed to an analog compensator which may be tuned and to a method of adaptive control allowing said analog compensator to be tuned. This tuning may be substantially continuous to optimise the performance of the analog compensator. It will be appreciated by those skilled in the art, that an analog compensator operates in substantially the same manner in a linear power supply, and therefore similar principles apply. As shown in FIG. 2, the arrangement comprises an analog compensator 22 operating substantially per the prior art analog compensator 14 of FIG. 1 with a number of small modifications which will be discussed In particular, in order to provide for tuning of the compensator, one or more of the components within the analog compensator 22 is variable to allow for tuning of the transfer function of the analog compensator 22 (which will be discussed in greater detail below). In addition, the circuit arrangement of the analog compensator 22 is selected so that measurement signals (e and x) may be obtained or derived directly from the compensator. These measurement signals in turn are provided to a tuning controller 28 to permit the tuning controller 28 to monitor the performance of the analog compensator 22 and tune it accordingly. Although, the tuner arrangement of FIG. 2 may be implemented in analog form, the problems associated with analog multipliers, such as, for example, size, sensitivity and DC offset, would make this impractical for a commercial implementation. Accordingly, the tuner is preferably implemented in digital form. In this respect, the one or more signals being monitored by the tuner may be converted using analog to digital converters 24, 26 to digital form, where after the tuning controller 28 may be implemented in digital form. Although, it will be appreciated that a variety of different tuning algorithms may be implemented, one which is particularly suitable is described in WO2008101864 (U.S. Ser. No. 12/439,802) and which is co-assigned to the present assignee of this application. An arrangement of this controller suitable for implementation in the present application is shown in block form in FIG. 6, the algorithm of the tuner 28 attempts to minimize the least mean square value of the error signal. In turn, the compensator 22' comprises two analog controllers C1, C2 with different control functions, the first being an aggressive control function and the second being a controller with a conservative control function with respect to one another. The compensator 22' combines the outputs from the conservative and the aggressive control function in a weighted fashion with a tuning value ($\alpha$) determining the weighting. The tuning value in turn is determined by a tuner (tuning controller) implementing a tuning function. It will be appreciated by those skilled in the art that such an arrangement need not necessarily be implemented with two distinct controllers and that the controller may be implemented within a signal controller in which the two control functions are combined into a single controller. In this combined controller, one or more components of the controller is suitably selected to be adjustable to provide for adjustment of the weighting between the two controllers within the overall control function. This adjustment is suitably continuous to ensure circuit optimization over time. Alternatively, the adjustment may be made during an initial calibration phase which may or may not be repeated thereafter. It will be appreciated that in contrast to the prior art, the controller will continue to operate normally during such a calibration phase, i.e. and by way of examples there is no limiting, open loop operation or disturbances introduced. It will be appreciated that this is a direct method of parametric adaptive control whereby the error signal is implicitly responsive to the model parameters of the system. The statistics of the error signal, such as its variance are of particular interest and relevance in this regard as they represent implicit information about the system. For example, the variance of the error signal will be low in a well regulated system, but will be high in a system which is not well regulated. Indirect parametric adaptive control methods may also be employed.

Figure 3:
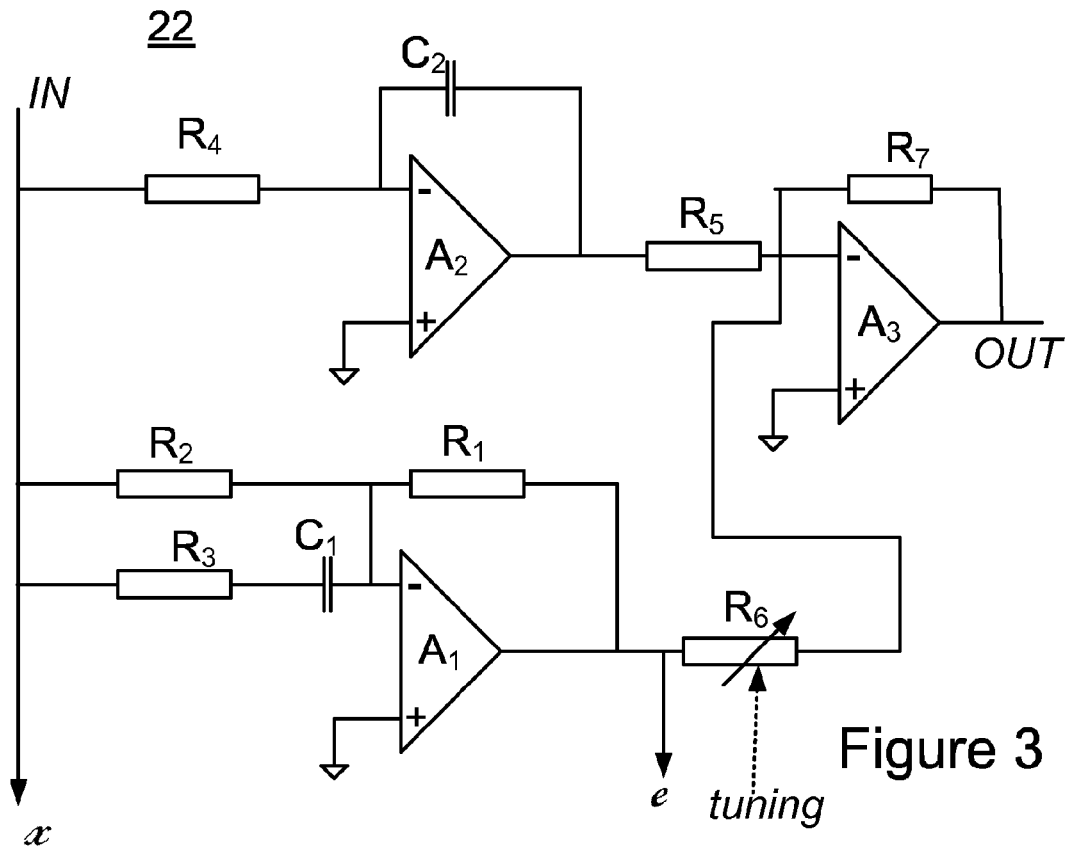
FIG. 3 is a block diagram of an analog compensator that may be used in accordance with the embodiment of FIG. 2.

An exemplary circuit structure of such an arrangement is shown in FIG. 3 in which a plurality of operational amplifiers, resistors and capacitors are employed to implement a control function. It will be appreciated that the particular values for the resistors and capacitors may be arrived at using conventional design techniques to implement a required control function with desired poles and gain function. In the exemplary circuit, one of the resistors is a variable resistor which may be varied in response to the tuning value. It will be appreciated by those skilled in the art that the variation of the resistor in response to the tuning value, makes this a non-linear circuit. The variable resistor may be comprised of a series combination of a fixed resistor and a variable resistor, with the fixed resistor employed to set a minimum value of resistance with the range of the variable resistor determining the maximum value. It will be appreciated by those skilled in the art that alternatives exist to implement a variable resistor function, such as R-DACs, switched capacitor circuits, variable-gain amplifiers and the like. The value of the variable resistor will vary from controller to controller and may readily be determined by the skilled person based on the particular control function required for the controller.

The signals (x and e) obtained from within the analog compensator are provided as tuning inputs to the tuner. The value x represents the error signal with the value e being taken as an internal signal from within the control function, in general terms it is sensitive to the variance of the error. It will be appreciated that such signal statistics are relevant in direct parametric control methods, as well as indirect methods and therefore using such an arrangement, continuous adaptive control of an analog compensator for a DC-DC converter may be implemented.

It will be appreciated that such an arrangement offers significant advantages over the prior art. In particular it will be appreciated that the arrangement offers continuous tuning (optimization) of the controller to optimize performance and not merely a change of controller characteristic under certain conditions for example when a significant transient is detected on the output or during a start-up calibration phase or measurement phase. Nonetheless, it will be appreciated that the tuner function when implemented digitally may require significant power for the multi-bit analog to digital converters and other elements. It will be appreciated by those skilled in the art that converter efficiency is of significant importance and thus any saving in power consumption is advantageous.

Figure 4:
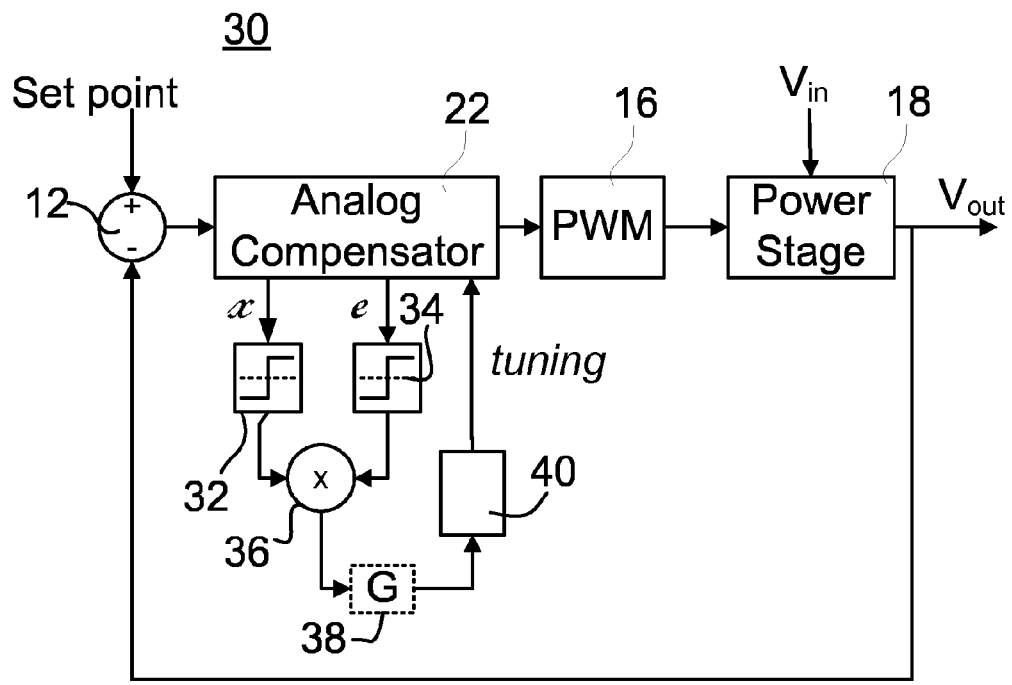
FIG. 4 is a block diagram of a circuit arrangement according to a second embodiment of the present application.

Accordingly, in a further embodiment a tuner, as shown in FIG. 4, is described in which the power consumption of multi-bit digital analog to digital converters is obviated. This is achieved by implementing the controller substantially within the analog domain using conventional lower power devices.

In this further embodiment, each of the tuning inputs (signals e and x) is provided from the analog compensator 22 as previously described. Each of the tuning inputs is provided to a level detector 32, 34 which identifies the sign of each tuning input, i.e. whether the value of each individual tuning input is positive or negative and provides an output indicating the sign. It will be appreciated that the outputs from each level detector 32, 34 may be regarded as a single bit value indicating the sign of each signal rather than its magnitude. The sign outputs from each of the level detectors 32, 34 are then multiplied together in a multiplier 36. Table 1 below shows the output from the multiplier 36 for different signs of x and e.

TABLE 1

| x | e | output |
|---|---|--------|
| + | + | +      |
| + | − | −      |
| − | + | −      |
| − | − | +      |

Advantageously, as will be appreciated from Table 1, the multiplier 36 may be implemented as a simple structure such as an XNOR gate, thus avoiding circuit complexity and problems associated with analog multipliers. It also saves on the power which might be incurred were the multiplication to be performed with multi-bit digital multipliers. The output from the XNOR gate in turn is fed as an input to an integrator 40. It will be appreciated that the output of the XNOR gate is such that the integrator 40 may be implemented in digital or analog form. Suitably, the integrator 40 may be a "leaky integrator". A leaky integrator has a low frequency pole, but not quite at DC, as required for a true integrator. The use of a leaky integrator may be useful when it is desirable for the tuner to forget its history. Suitably, the pole frequency may be in the region of 1 Hz to 100 Hz. A gain element 38 may optionally be inserted between the XNOR gate and the integrator 40 to limit the rate at which the tuner adjusts the analog compensator 22. Suitably, the value of this gain element 38 may be 8. Those skilled in the art will realize that the gain element 38 may equivalently by placed in the path of either input to the multiplier 36, and suitable gain values are circuit and system dependant.

As previously described, the tuning signal may be used to adjust a tuning device (possibly comprising a plurality of components) within the analog compensator 22 to alter its characteristics and thus optimize the performance of the controller. The tuning device may be for example a voltage programmable resistance or a voltage variable gain element or similar device or combination thereof. Where the tuning value is in digital form, the tuning device may be, for example a digitally programmable resistance or capacitor or switched capacitor circuit or variable-conductance amplifier or combination thereof.

As explained above advantages of using level detectors is that the analog multipliers may be implemented simply and the power consumption of the ADC's obviated. Nonetheless, this simple form providing the sign of the signals, i.e. whether they are positive or negative, may be expanded to include a no-sign third level equating to zero i.e. a region regarded as deadband. It will be appreciated that even with this inclusion, the multiplication is extremely simple since there is no magnitude involved as such, merely signs or the absence of a sign, i.e. if the inputs may only be +(1), 0 and −(−1), the output of the multiplier may only be +, 0 or − as shown in Table 2 below.

TABLE 2

| x | e | output |
|---|---|--------|
| + | + | + |
| ± | 0 | 0 |
| 0 | ± | 0 |
| + | − | − |
| − | + | − |
| − | − | + |

It will be appreciated that the functionality of the level detectors, multipliers, gain and\or integrator may be implemented in analog or digital form or a combination thereof.

One problem that can arise is that the desired signals to implement the state function are not necessarily available directly from the analog compensator, for example because the circuit design of the compensator does not have a node corresponding to the desired signal available.

Figure 5:
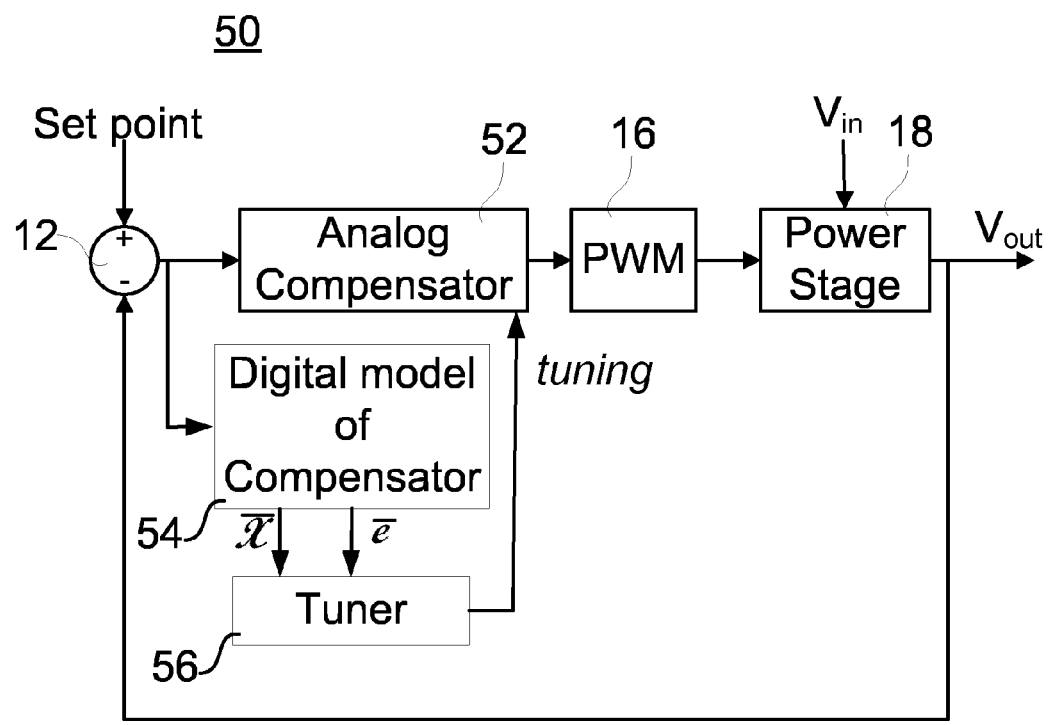
FIG. 5 is a block diagram of a circuit arrangement according to a third embodiment of the present application.

To address this problem and also to reduce the requirement for multiple ADC's or level detectors, a further embodiment, as shown in FIG. 5, is provided. In this further embodiment, the error signal is provided as before to the analog compensator 52, which may be, for example, as shown in FIG. 2. The error signal is also converted to digital form by an ADC or level detector (not shown) and provided to a digital model 54 of the analog compensator 52. The digital model 54 has substantially the same control function of the analog compensator 52 albeit in digital form. In contrast to the analog compensator 52, the digital model 54 does not provide a control output to the PWM circuit. Instead, the purpose of the digital model 54 is to generate one or more signals which substantially replicate those which are unavailable from the analog compensator 52 and may be used by the tuner 56 to tune the analog compensator 52 in accordance with techniques described above. The digital model derived signals are effectively derived from and equivalent to those from the analog compensator 52 but are not directly obtained from the analog compensator 52. Furthermore they may differ in several aspects but may still contain the statistical information required to effect tuning of the system.

It will be appreciated that whilst several different embodiments have been described herein, that the features of each may be advantageously combined together in a variety of forms to achieve advantage.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections. Thus as an example, whilst the present application has been described with reference to switching power supplies, it will be appreciated by those skilled in the art that it may also be applied to linear (non-switching) power supplies. In such an arrangement, it will be appreciated that the power stage may include one or more transistors operating linearly to regulate the output voltage in response to a control signal in place of one or more switching transistors typically employing PWM.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciate that conductivity types and polarities of potentials may be reversed.

Semiconductor devices may operate in linear or switching modes of operation as appropriate, and different embodiments may vary the operating mode of some or all of the semiconductor devices appropriately from switching to linear or vice versa in order to achieve advantage.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Thus, for example, as linear and switching power supplies are compensated according to similar principles it will be appreciated that the same control techniques described herein may be applied to both, albeit that a linear power supply need not, for example, employ the PWM circuitry. Thus for example the present techniques may be employed in a linear LDO (low drop out voltage) regulator where the PWM circuitry may be replaced with a suitable biasing circuit providing a biasing signal to a transistor arrangement with the regulator to maintain the output voltage at the required set point.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps than those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or an limits any particular claim containing such introduced claim element to inventions containing only one such element, even when the same claim includes the introductory phrases one or more or at least one and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A parametric adaptive controller for a power supply comprising a power stage, the parametric adaptive controller comprising:
   an analog compensator using feedback from an output of the power stage to provide at least one control output to the power stage to maintain the output of the power stage of the power supply at a desired level, wherein the analog compensator is implemented in a circuit and wherein at least one component of the circuit is adjustable to modify a transfer function of the controller in response to a tuning signal, and
   a tuner obtaining at least two signals from the analog compensator or an equivalent circuit of the analog compensator, with a first signal being a feedback error signal comprising a difference between the desired level and the output and a second signal being a signal sensitive to the variance of the feedback error signal, wherein the tuner is at least partially implemented in digital form and is adapted to continuously adjust the at least one circuit component in response to the monitoring of the obtained at least two signals to provide continuous adaptive control of the analog compensator,
   wherein two values are provided to the tuner derived from signals from the analog compensator and each of the two values identifies the sign of a signal derived from the analog compensator, and wherein one or more of the sign of the signal derived from the analog compensator includes no sign corresponding to a region of deadband about zero, or the tuner comprises a multiplier multiplying the sign values to provide a multiplier output.

2. A parametric adaptive controller according to claim 1, wherein the multiplier performs a single bit multiplication.

3. A parametric adaptive controller according to claim 1, wherein the tuner comprises an integrator accepting a signal from the multiplier as an input and wherein the integrator output is provided as the tuning signal.

4. A parametric adaptive controller according to claim 3, wherein the signal being provided from the multiplier to the integrator is a gain scaled signal.

5. A parametric adaptive controller according to claim 4, wherein the gain scaling is a factor of 8.

6. A parametric adaptive controller according to claim 3, wherein the integrator is a leaky integrator.

7. A parametric adaptive controller according to claim 6, wherein the leaky integrator is one with a pole having a frequency less than 100 Hz.

8. A parametric adaptive controller according to claim 1, wherein the equivalent circuit of the analog compensator comprises a digital model representative of but not the analog compensator, wherein the tuner obtains the at least two signals from the digital model.

9. A parametric adaptive controller according to claim 1, wherein the analog compensator comprises two control functions whose outputs are combined in a weighted fashion to provide the at least one control output, wherein the tuner is configured to adjust the weighting to alter the transfer function of the analog compensator.

10. A power supply comprising:
    an adaptive controller comprising:
    a power stage,
    an analog compensator using feedback from an output of the power stage to provide at least one control output to the power stage to maintain the output of the power stage of the power supply at a desired level, wherein the analog compensator is implemented in a circuit and wherein at least one component of the circuit is adjustable to modify the transfer function of the controller in response to a tuning signal, and
    a tuner obtaining at least two signals from the analog compensator or an equivalent circuit of the analog compensator, with a first signal being a feedback error signal comprising the difference between the desired level and the output and a second signal being a signal sensitive to the variance of the feedback error signal, wherein the tuner is at least partially implemented in digital form and is adapted to continuously adjust the at least one circuit component in response to the monitoring of the derived at least two signals from the analog compensator to provide continuous adaptive control of the analog compensator,
    wherein two values are provided to the tuner derived from signals from the analog compensator and each of the two values identifies the sign of a signal derived from the analog compensator, and wherein one or more of the sign of the signal derived from the analog compensator includes no sign corresponding to a region of deadband about zero, or the tuner comprises a multiplier multiplying the sign values to provide a multiplier output.

11. A power supply according to claim 10, wherein the power supply is a switch mode power supply.

12. A power supply according to claim 11, wherein the control output is provided by a PWM circuit in response to a control signal received from the analog compensator.

13. A power supply according to claim 10, wherein the power supply is a linear power supply.

14. A power supply according to claim 10, wherein the linear power supply is a low drop out regulator.

15. A power supply according to claim 10, wherein the power supply is a DC-DC converter.

16. A controller for a power supply, the controller comprising: an analog compensator for providing a control signal to at least one circuit of the power supply to maintain the output of the power supply at a set-point, wherein the analog compensator includes at least one adjustable component which may be adjusted to alter the transfer function of the analog compensator, and
 a tuner for adjusting the adjustable component to tune the operation of the analog compensator, wherein the tuner is responsive to at least two signals from within the analog compensator, wherein the tuner is responsive to sign changes in each of the signals, and wherein two values are provided to the tuner derived from signals from the analog compensator and each of the two values identifies the sign of a signal derived from the analog compensator, and wherein the sign of the signal derived from the analog compensator includes no sign corresponding to a region of deadband about zero.

17. A controller according to claim 16, wherein the analog compensator comprises two control functions whose output is combined in a weighted fashion tuning controller, wherein the tuner is configured to adjust the weighting to alter the transfer function of the analog compensator.

18. A controller for a power supply, the controller comprising:
 an analog compensator for providing a control signal to the power supply, the analog compensator comprising at least one component for adjusting the transfer function of the analog compensator, and
 a circuit providing a digital model of the analog compensator, wherein at least one measurement from within the digital model is employed to adjust the at least one component of the analog compensator, and wherein two values are provided to the circuit derived from signals from the analog compensator and each of the two values identifies the sign of a signal derived from the analog compensator, and wherein the sign of the signal derived from the analog compensator includes no sign corresponding to a region of deadband about zero.

19. A controller according to claim 18, wherein the analog compensator comprises two control functions whose outputs are combined in a weighted fashion to provide the transfer function of the controller, wherein the at least one component for adjusting the transfer function varies the weighting to adjust the transfer function of the analog compensator.

* * * * *